(12) United States Patent
Shoap

(10) Patent No.: US 8,113,554 B2
(45) Date of Patent: Feb. 14, 2012

(54) METHOD AND APPARATUS FOR AN ATTACHABLE AND REMOVABLE CRUMPLE ZONE

(76) Inventor: Stephen D. Shoap, Wakefield, MA (US)

( * ) Notice: Subject to any disclaimer, the term of this patent is extended or adjusted under 35 U.S.C. 154(b) by 0 days.

(21) Appl. No.: 12/607,411

(22) Filed: Oct. 28, 2009

(65) Prior Publication Data

US 2010/0109356 A1 May 6, 2010

Related U.S. Application Data

(60) Provisional application No. 61/197,795, filed on Oct. 30, 2008.

(51) Int. Cl.
*B60N 2/42* (2006.01)
(52) U.S. Cl. ............ 293/109; 293/110; 296/187.11
(58) Field of Classification Search ........... 296/187.11, 296/187.03; 293/107, 109, 110, 102, 120, 293/132, 133, 134, 135, 136, 137
See application file for complete search history.

(56) References Cited

U.S. PATENT DOCUMENTS

| | | | |
|---|---|---|---|
| 1,347,937 A | 7/1920 | Clary | |
| 1,643,517 A | 9/1927 | Price | |
| 2,092,476 A | 9/1937 | Schulman | |
| 3,307,867 A | 3/1967 | McGovern | |
| 3,412,628 A | 11/1968 | De Gain | |
| 3,782,768 A | 1/1974 | Moore | |
| 3,834,483 A * | 9/1974 | Palmer | 180/271 |
| 3,903,997 A * | 9/1975 | Brooks | 188/377 |
| 4,097,080 A | 6/1978 | Petry | |
| 4,231,607 A | 11/1980 | Bohlin | |
| 4,272,103 A | 6/1981 | Schmid et al. | |
| 4,352,484 A | 10/1982 | Gertz et al. | |
| 4,394,108 A | 7/1983 | Cook et al. | |
| 4,431,221 A | 2/1984 | Jahnle | |
| 4,512,604 A | 4/1985 | Maeda et al. | |
| 4,781,398 A | 11/1988 | Uebelstadt et al. | |
| 4,830,417 A | 5/1989 | Bates et al. | |
| 4,950,522 A | 8/1990 | Vogt et al. | |
| 5,042,837 A | 8/1991 | Kleinschmit et al. | |
| 5,072,805 A | 12/1991 | Meiners | |
| 5,474,144 A | 12/1995 | Tarng | |

(Continued)

FOREIGN PATENT DOCUMENTS

GB   1103693   2/1968

(Continued)

OTHER PUBLICATIONS

Toyota Motor Corporation, i-unit Overview, http:www.toyota.co.jp/en/news/04/1203_1e.html, web page accessed Jul. 31, 2007, 2 pages.

*Primary Examiner* — Joseph Pape
(74) *Attorney, Agent, or Firm* — Hayes Soloway PC

(57) ABSTRACT

A system for absorbing impact energy includes a container formed with a plurality of faces, wherein the container is attached to a vehicle. An energy-absorbing material is substantially contained within the container. At least one elongated member having a proximate end and a distal end is included, wherein the proximate end is proximate to a first face of the container. A long axis of the at least one elongated member may intersect the first face. A bumper may be connected to the distal end of the at least one elongated member.

14 Claims, 10 Drawing Sheets

U.S. PATENT DOCUMENTS

| | | | |
|---|---|---|---|
| 5,782,483 | A | 7/1998 | Rogers et al. |
| 5,819,408 | A | 10/1998 | Catlin |
| 5,968,973 | A | 10/1999 | Wang |
| 6,164,897 | A | 12/2000 | Edwards |
| 6,174,008 | B1 | 1/2001 | Kramer et al. |
| 6,220,652 | B1 | 4/2001 | Browne et al. |
| 6,302,458 | B1 | 10/2001 | Wang et al. |
| 6,374,934 | B1 | 4/2002 | Beck et al. |
| 6,409,253 | B2 | 6/2002 | Larsson et al. |
| 6,420,803 | B1 | 7/2002 | Woodall et al. |
| 6,460,667 | B1 | 10/2002 | Bruck et al. |
| 6,540,275 | B1 | 4/2003 | Iwamoto et al. |
| 6,601,873 | B1 | 8/2003 | Bartesch et al. |
| 6,623,054 | B1 | 9/2003 | Palmquist |
| 6,688,831 | B2 | 2/2004 | Antonucci et al. |
| 6,709,035 | B1 | 3/2004 | Namuduri et al. |
| 6,773,044 | B2 | 8/2004 | Schambre et al. |
| 6,834,899 | B2 | 12/2004 | Lindsey |
| 6,840,542 | B2 | 1/2005 | Kim |
| 6,869,132 | B2 | 3/2005 | Wang et al. |
| 6,893,079 | B1 | 5/2005 | Johnson et al. |
| 6,905,282 | B2 | 6/2005 | Leonhardt et al. |
| 6,908,128 | B2 | 6/2005 | Strong |
| 6,926,322 | B2 | 8/2005 | Browne et al. |
| 6,926,326 | B2 | 8/2005 | Iyoda et al. |
| 6,932,201 | B2 | 8/2005 | Akiyama et al. |
| 6,976,718 | B2 | 12/2005 | Nakanishi |
| 7,044,514 | B2 * | 5/2006 | Mustafa et al. ............... 293/109 |
| 7,201,413 | B2 | 4/2007 | Hillekes et al. |
| 7,210,718 | B1 | 5/2007 | Budhu |
| 7,472,935 | B2 * | 1/2009 | Love ............................ 293/134 |
| 2006/0006019 | A1 | 1/2006 | Caserta et al. |
| 2006/0145433 | A1 | 7/2006 | Kim |

FOREIGN PATENT DOCUMENTS

| | | |
|---|---|---|
| WO | 2006112732 A1 | 10/2006 |

* cited by examiner

METHOD AND APPARATUS FOR AN ATTACHABLE AND REMOVABLE CRUMPLE ZONE

CROSS-REFERENCE TO RELATED APPLICATION

This application claims priority to copending U.S. Provisional Application entitled, "Additional Ideas for Creating a Safer Small Car," having Ser. No. 61/197,795 filed Oct. 30, 2008, which is entirely incorporated herein by reference.

FIELD OF THE DISCLOSURE

The present disclosure is generally related to a vehicle safety system, and more particularly is related to a method and apparatus for an attachable and removable crumple zone.

BACKGROUND OF THE DISCLOSURE

Auto engineers have made great improvements in reducing injuries caused by frontal collisions. Air bags and seat belts work well. Also, the front of most vehicles contains the engine and the engine compartment, which can be designed to operate as a "crumple zone". A crumple zone is a volume that absorbs at least a portion of the energy of a collision and lengthens the time of the collision event. The crumple zone presents a force in opposition to the collision force over a distance. By increasing the time of the collision event, and by absorbing a portion of the collision energy, the crumple zone reduces the G-Forces on the vehicle occupants.

Rear collisions are a serious problem for small vehicles because the small vehicles do not have large trunk volumes comparable to the engine compartments. A small vehicle with a small trunk will offer little protection to the occupants when the vehicle is hit from the rear. Large vehicles typically have larger trunks, which can be designed to operate as an effective crumple zone.

Air bags are not useful in rear collisions because the occupants are in close contact with their seats. In a rear collision, the seats push on the bodies of the person in the seat. While there is some advantage to having the seats slide backwards in this situation, sliding seats is not an accepted practice because rear moving front seats could crush the legs of rear seat passengers.

With no crumple zone in the rear, the small vehicle exposes its passengers to very high G-forces during rear collisions because motion of their bodies will change very rapidly. Force=Mass×Acceleration. The rapid velocity change of their bodies is a large acceleration and the resultant force on their bodies (masses) will be large. Also, a small vehicle will have a relatively small mass, and when it is hit in the rear by another vehicle while inert, the force from the collision on the low mass small vehicle will generate large accelerations, directly translating large accelerations and proportionally large forces on the passenger bodies.

Even if a passenger is constrained so that his body does not strike a hard surface, the high acceleration can tear internal organs and blood vessels. Similarly, the skull may move and compress and injure the brain.

Previous technology in this area has offered front, side and rear bumpers fixedly attached to springs in order to reduce damage to the vehicle from a collision. The springs may operate to absorb some of the force in a collision. Later technology had other shock absorbing devices that were placed between the bumpers and the vehicle. These devices were designed to dissipate some of the energy of the collision to reduce passenger injuries. Some of these devices allowed for the bumpers to be moved between multiple positions. These shock-absorbing devices were relatively small in volume which limited the amount of energy they could absorb.

Some other technology provides bumpers that remain in a retracted position until moments before an impending accident was detected. Then the bumpers would be rapidly extended. The detection of an impending accident is very difficult. There are many technologies that might be used to try to detect an impending collision, but they all suffer from the possibility of false alarms. A false alarm might injure a person who is next to the vehicle when the bumpers are deployed or cause property damage.

Thus, a heretofore unaddressed need exists in the industry to address the aforementioned deficiencies and inadequacies.

SUMMARY OF THE DISCLOSURE

Embodiments of the present invention provide a system and method for absorbing impact energy. Briefly described, in architecture, one embodiment of the system, among others, can be implemented as follows. The system includes a container formed with a plurality of faces. The container is attached to a vehicle. An energy-absorbing material is substantially contained within the container. At least one elongated member, having a proximate end and a distal end and the proximate end proximate to a first face of the container, wherein a long axis of the at least one elongated member intersects the first face. A bumper is connected to the distal end of the at least one elongated member.

The present disclosure can also be viewed as providing methods of absorbing impact energy. In this regard, one embodiment of such a method, among others, can be broadly summarized by the following steps: impacting a bumper located external to a vehicle with a quantity of impact energy; transferring the quantity of impact energy to at least one elongated member; and absorbing at least a portion of the quantity of impact energy with a quantity of energy-absorbing material at least partially housed within a container formed with a plurality of sides, wherein the container is attached to a vehicle.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
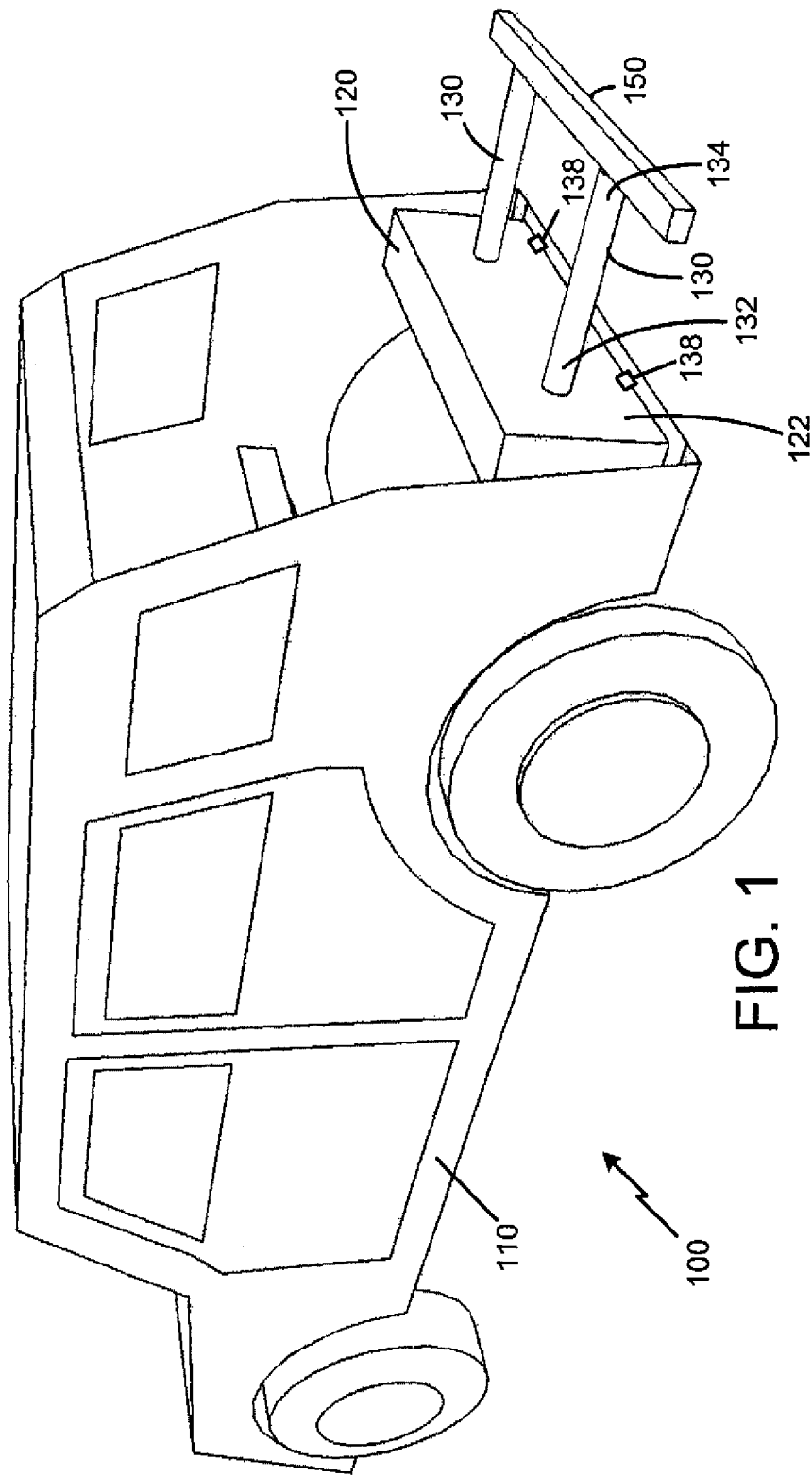
FIG. 1 is an illustration of a plan view of a system for absorbing impact energy, in accordance with a first exemplary embodiment of the present disclosure.

FIG. 1 is an illustration of a plan view of a system 100 for absorbing impact energy, in accordance with the first exemplary embodiment of the present disclosure. The system 100 includes a container 120 formed with a plurality of faces. The container 120 is attached to a vehicle 110. An energy-absorbing material is contained substantially within the container 120. At least one elongated member 130 is included. The at least one elongated member 130 has a proximate end 132 and a distal end 134. The proximate end 132 is located to a first face 122 of the container 120, wherein a long axis of the at least one elongated member 130 intersects the first face 122. A bumper 150 is connected to the distal end 134 of the at least one elongated member 130.

The container 120 may be formed from a plurality of faces. In FIG. 1, the container 120 is depicted with six faces, but the container 120 may include any number of faces. At least one face of the container 120 may be characterized as a first face 122, and may be proximate to the at least one elongated member 130. The container 120 may be constructed from any material capable of containing, at least substantially, the quantity of energy-absorbing material during an anticipated impact. The quantity of energy-absorbing material may include a variety of materials having a variety of forms. For example, the quantity of energy-absorbing material may include natural or synthetic materials, which may be in solid, liquid or gaseous form, or any combination thereof.

The system 100 includes at least one elongated member 130. In FIG. 1, the system 100 is depicted with two elongated members 130. The elongated member 130 is generally a member having a high structural integrity, whereby the elongated member 130 substantially resists structural deformations from any impact energy absorbed. Common elongated members 130 may be formed from materials including, but not limited to, steel, aluminum, carbon, plastic or any combination thereof. The proximate end 132 of the elongated member 130 is located proximate to a first face 122 of the container 120. In accordance with many design variations, the elongated member 130 may be connected to, mounted to, traversing or passing through the first face 122.

Additionally, the first face 122 and the elongated member 130 may be positioned approximately perpendicular, as illustrated in FIG. 1. However, other positions that are not considered approximately perpendicular may also be included, as varied by design. For example, two or more elongated members 130 may be positions at a variety of angles to the first face 122, such as in "V" or "W" shapes. In addition, any combination of positions and angles may be employed, which may include elongated members 130 being at one position when the system 100 is positioned to absorb impact energy, and a second position when the system 100 absorbs impact energy. As one having ordinary skill in the art will recognize, success within the system 100 may be achieved through a variety of design variations. Regardless of the design variation between the at least one elongated member 130 and the first face 122, a long axis of the at least one elongated member 130 may intersect the first face 122, wherein the long axis may be considered an axis that is parallel to the length of the elongated member 130.

The bumper 150 is connected to the elongated member 130 at the distal end 134. The bumper 150 may be connected to the elongated member 130 through a variety of connections, including but not limited to fasteners, removable fasteners, integral connections or permanent connections, such as welding, bonding or molding. The bumper 150 may be any structure capable of receiving an impact force from an external source, such as another vehicle. Commonly, the bumper 150 may include a high-strength member disposed substantially horizontal to a ground surface. The bumper 150 may be constructed from any high-strength material, including, but not limited to, steel, carbon, a metallic alloy, a hardened rubber, plastic, a natural material, a synthetic material, or any combination thereof. As one having ordinary skill in the art would recognize, many design variations and configurations with the bumper 150 are available, all of which are considered within the scope of the present disclosure.

The system 100 may include a container 120 that is located in any of a variety of positions about the vehicle 110. In accordance with the first exemplary embodiment, as depicted in FIG. 1, the container 120 may be located in a rear interior volume of the vehicle 110. Accordingly, the at least one elongated member 130 may extend from the rear interior volume of the vehicle 110 to a location exterior to the vehicle 110. The vehicle 110 may be any automobile or other transport vessel. For example, system 100 may be employed on a vehicle 110 having a rear hatch door, a trunk, hinged doors, a bed or any other structure of the vehicle 110 wherein a container 120 may be attached.

In FIG. 1, system 100 is depicted within the rear interior volume of a vehicle 110, wherein the rear hatch door of the vehicle is removed to show the system 100. It can be seen that the container 120 is attached to the vehicle 110, wherein the proximate end 132 of the elongated member 130 is proximate to the first face 122 of the container 120, and the distal end 134 is connected to the bumper 150. In this example, the container 120 may be placed on the floor of the rear interior volume of the vehicle. The system 100 may be especially suited for small vehicles 110 that do not have a trunk or a rear interior volume area that extends significantly behind the rear seats, because there is not much metal, or other materials within the structure of the vehicle 110 for impact energy to be absorbed, nor the distances for any absorption to occur. Accordingly, when the rear end of the vehicle 110 is close to the rear seat passengers, the system 100 may prevent injuries by absorbing impact energy that the vehicle 110 itself is unable to absorb, when the vehicle 110 is hit in the rear by another vehicle.

The container 120 may absorb impact energy from a collision. When the system 100 is located at the rear of a vehicle 110, it is best situated to absorb impact energy from a rear collision. The system 100 may be attachable and removable to the vehicle 110, but is generally not integral to a chassis of the vehicle 110. All components of the system 100, including the container 120, the elongated member 130, and the bumper 150 may be removed from the vehicle 110, such as if more rear cargo volume is needed.

The system 100 may be attached to the vehicle 110 in a variety of ways. Generally, the container 120 is attached to a structural member of the vehicle 110, such as a chassis member. The system 100 may be attached via a fastener 138 located between the container 120 and a structural member of the vehicle 110. The fastener 138 may include any fastener available, such as a quick release fastener, whereby the system 100 can be conveniently removed and later re-installed. An example of a fastener that may be used with the system 100 is disclosed in U.S. Pat. No. 4,478,546 entitled, "Quick Insertion and Release Bolt System." In addition, the container 120 may be attached to the vehicle 110 by other systems, such as an integral connection, a removable connection interface or another attachment system, as is known by one having ordinary skill in the art.

The system 100 may be configured for disassembly, either partially or in its entirety. This may be particularly useful when the system 100 is not is use and needs to be stored. Accordingly, the elongated member 130 may be removed from the container 120, and disconnected from the bumper 150. Disassembly of the system 100 may include releasing quick release fasteners to allow separation of the different components of the system 100 to reduce the weight that must be moved at any one time.

Figure 2:
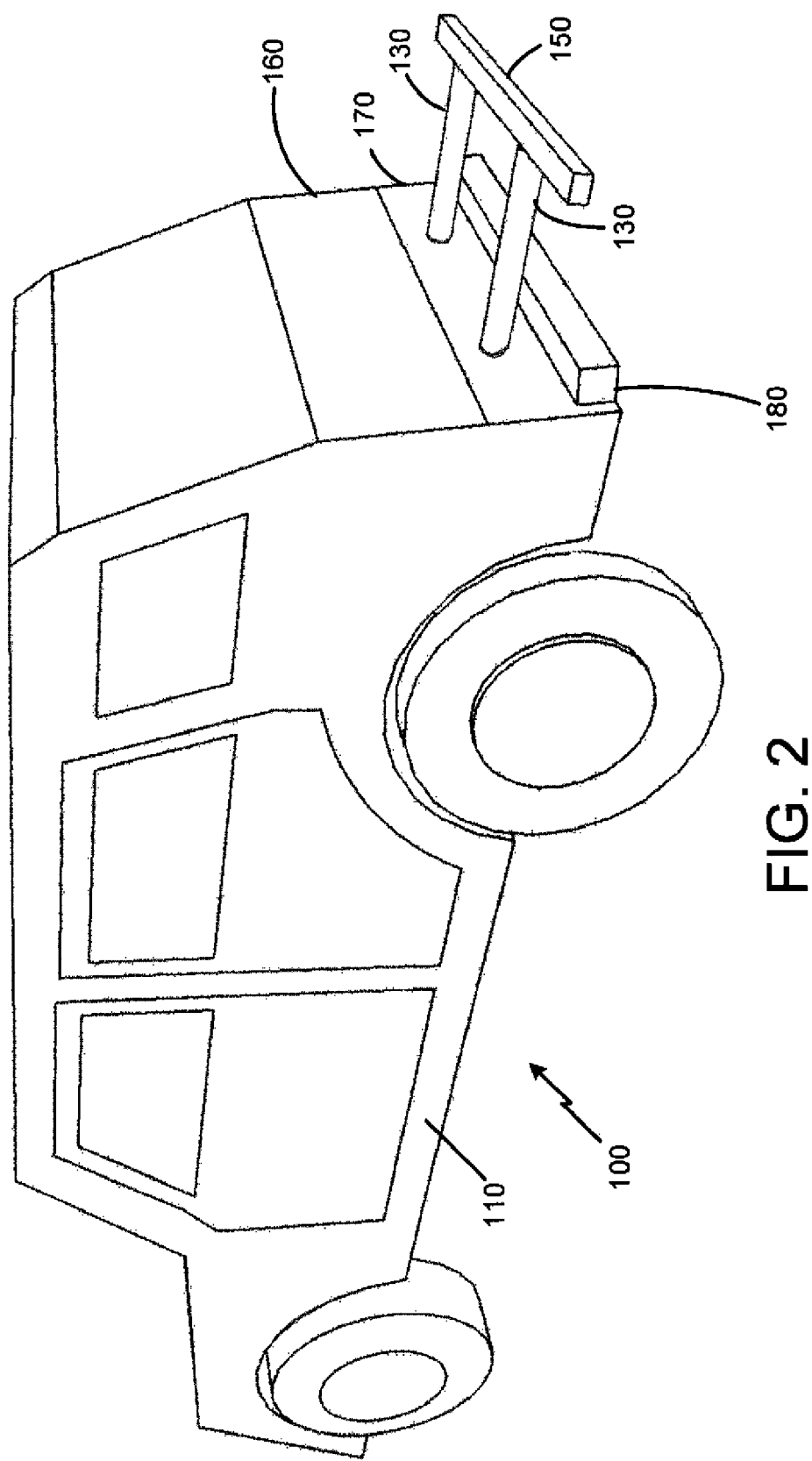
FIG. 2 is an illustration of a plan view of the system for absorbing impact energy, in accordance with the first exemplary embodiment of the present disclosure.

FIG. 2 is an illustration of a plan view of a system 100 for absorbing impact energy, in accordance with the first exemplary embodiment of the present disclosure. FIG. 2 depicts the system 100 located within the rear interior volume of the vehicle 110 wherein a rear hatch door 160 is depicted in the closed position. The system 100 may be configured to fit within the rear interior volume of a vehicle 110, whereby a rear opening of the vehicle 110 can be closed while the system 100 remains in place. For example, the system 100 may include a rear hatch door 160 having a lower body panel 170. The lower body panel 170 may include holes that allow the at least one elongated member 130 to be positioned between the rear interior volume of the vehicle 110 and a position exterior to the vehicle 110. When the system 100 and the at least one elongated member 130 is removed from the vehicle 110, plugs or other features may be inserted to fill the opening(s) in the lower body panel 170.

The system 100 may be configured to allow the rear hatch door 160 to be opened without interference from the elongated member 130. In addition, the elongated member 130 and the bumper 150 may be situated to retract into the vehicle 110 to allow for easier parking. The system 100 may also be situated to be retracted in any other configuration to allow for a more convenient use of a vehicle 110 when the system 100 is not in use. Any retracting of the system 100 or expanding the system 100 from a retracted position may be performed manually by the driver of the vehicle 110 or user of the system 100. Additionally, any retracting of the system 100 or expanding the system 100 from a retracted position may be performed by electric motors or equivalent motion producing systems. When the system 100 is in a retracted position, a conventional bumper 180 may protect the vehicle 110 from any collisions.

Figure 3:
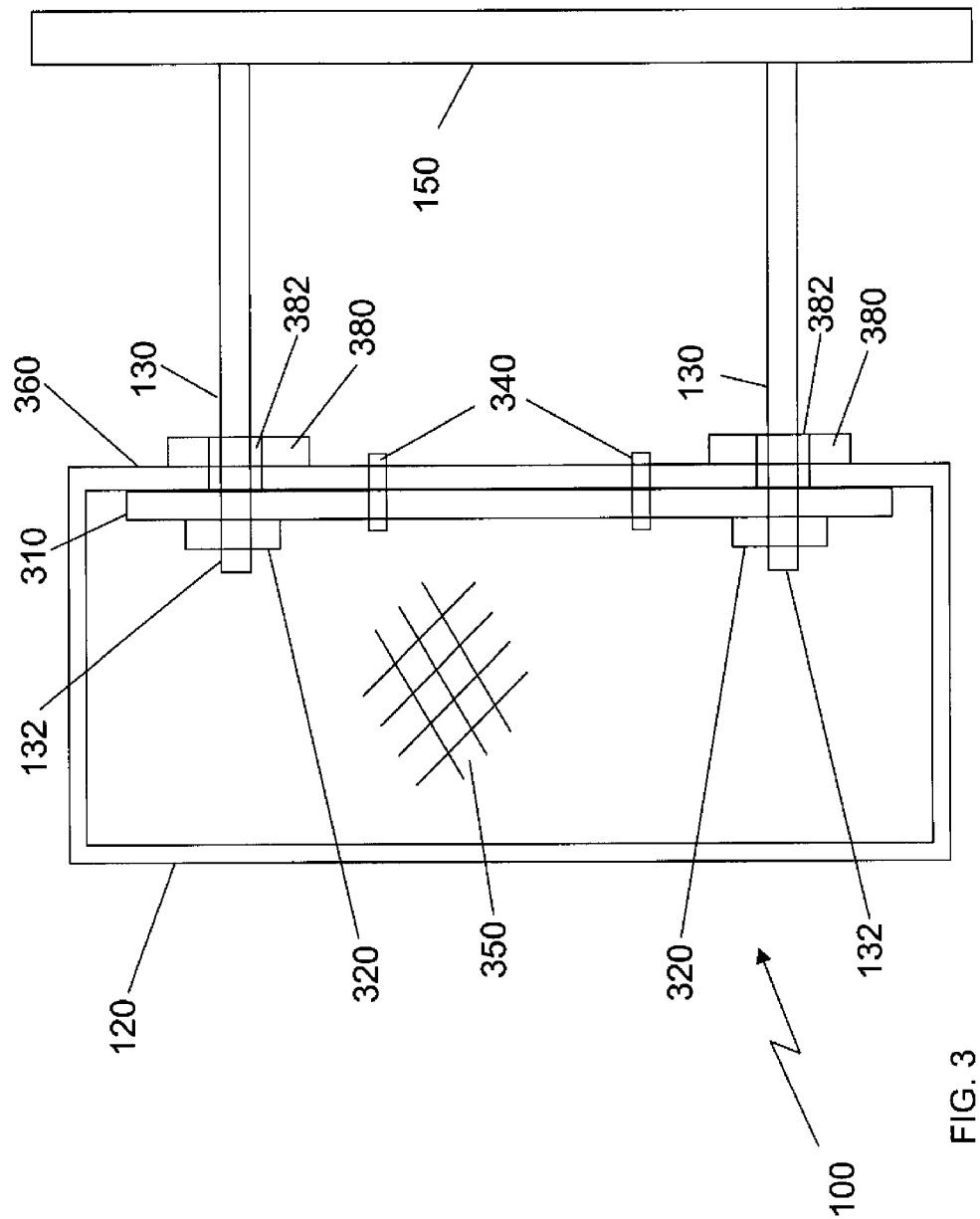
FIG. 3 is an illustration of a top view of the system for absorbing impact energy, in accordance with the first exemplary embodiment of the present disclosure.

FIG. 3 is an illustration of a top view of the system 100 for absorbing impact energy, in accordance with the first exemplary embodiment of the present disclosure. As can be seen, system 100 is depicted with two elongated members 130 traversing the container 120. The elongated members 130 of FIG. 3 are depicted in their fully extended position. A first plate 310 is mounted within the container 120 and connected to proximate ends 132 of the elongated members 130. The first plate 310 may be connected to the container 120 with at least one breakable bolt 340. The first plate 310 is depicted as having two breakable bolts 340 connecting it to the container 120. The elongated member 130 may be attached to the first plate 310 by one or more shuttling mechanisms 320, which are discussed further with reference to FIG. 4. Additionally, the elongated members 130 may be directly attached to the first plate 310 (not shown), when the bumper 150 is configured to always be extended and never retracted into the container 120. Just as any number of elongated members 130 may be used in the system 100, any number of control units may also be used. The system 100 includes an energy-absorbing material 350 disposed within the container 120.

The energy-absorbing material 350 may include a variety of substances and compositions, including, but not limited to, foam, highly viscous liquids, gelatin substances and a substance formed from a large quantity of small particles. Many energy-absorbing materials 350 may only be compressed once, and therefore must be replaced after being compressed. Accordingly, during a low speed impact to the rear bumper 150, where an impact force on the system 100 is relatively small, the breakable bolts 340 may be configured to not break, thereby retaining the plate 310 from moving away from the rear wall 360. As a result, an unnecessary compression of the energy-absorbing material 350 may be avoided. However, during a higher speed impact to the rear bumper 150, where an impact force on the system 100 is large, the breakable bolts 340 may break, thereby allowing the plate 310 to compress the energy-absorbing material 350. This compression of the energy-absorbing material 350 may reduce the G-forces on the vehicle 110 and any passengers within the vehicle 110.

A variety of breakable bolts 340 may be used with the system 100. One type of breakable bolt 340 is disclosed in U.S. Pat. No. 6,688,831 to Antonucci, et al. Other types of breakable bolts 340 may include other commonly known fasteners or other retaining mechanisms. Any mechanism that is capable of retaining the first plate 310 in a position proximate to the rear wall 360 of the system 100 and releasing the first plate 310 from that position under a given impact force is considered within the scope of the present disclosure.

Reinforcing plates 380 may also be included in the system 100. The reinforcing plates 380 may be mounted on or exterior to the container 120. The reinforcing plates 380 are at least partially disposed about the elongated members 130. In FIG. 3, the reinforcing plates 380 are attached to the rear wall 360 in a position proximate to where the elongated members 130 enter the container 120. The reinforcing plates 380 are designed to facilitate a bending of the elongated members 130 during an oblique angled rear collision. The bending of the elongated members 130 may absorb impact energy when the elongated members 130 are not driven into the container 120 to compress the plate 310 and the energy-absorbing material 350. This generally occurs when a rear collision arrives at a large oblique angle. The reinforcing plates 380 may include openings 382, which are made larger than the elongated member 130 to allow the elongated members 130 to enter the container 120 when a rear collision is substantially straight on.

Figure 4:
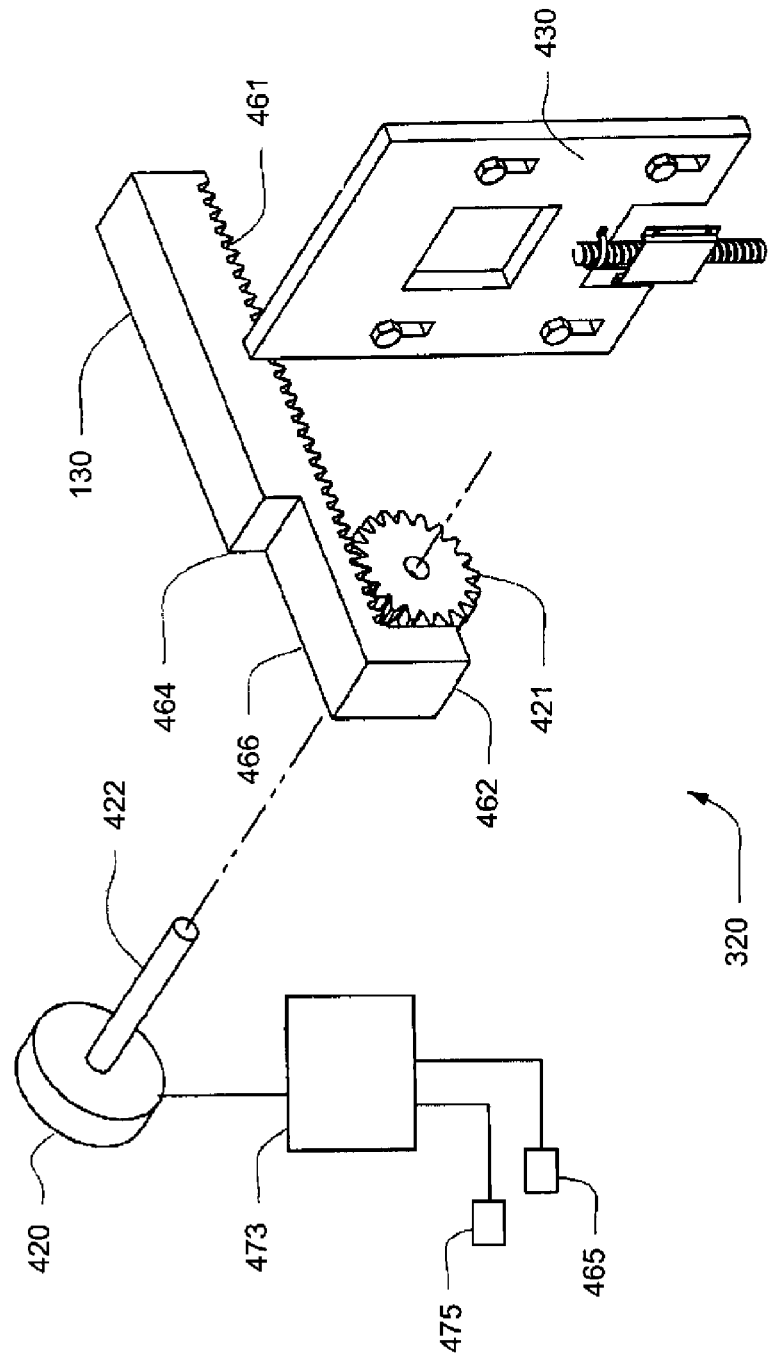
FIG. 4 is an illustration of an exploded perspective view of the control unit of FIG. 3, in accordance with the first exemplary embodiment of the present disclosure.

FIG. 4 is an illustration of an exploded perspective view of the shuttling mechanism 320 of FIG. 3, in accordance with the first exemplary embodiment of the present disclosure. The shuttling mechanism 320 may be characterized as a system for shuttling at least a portion of the at least one elongated member 130 within a container. The shuttling mechanism 320 may also be referred to as a control unit within the industry. Any number of shuttling mechanisms 320, but generally, the number of shuttling mechanisms 320 will correspond to the number of elongated members 130. The shuttling mechanism 320 may include a manual shuttling mechanism 320 for shuttling at least of portion of the at least one elongated member 130 within the container. In one of many alternatives, an automated shuttling mechanism 320 may also be used.

The shuttling mechanism 320 may include a mechanical engagement mechanism 461 integral with the at least one elongated member 130. The mechanical engagement mechanism 461 may include a variety of engagements, such as a rack structure having gear teeth or an engagable fastener. In FIG. 4, the mechanical engagement mechanism 461 is depicted as gear teeth located on the elongated member 130. The elongated member 130 may include a first face 462, a second face 464, and a shaft tip 466 connecting the first face 462 and the second face 464. A motor 420 may be connected to the container 120 and a gear 421 may be connected to the motor 420 and engaged with the mechanical engagement mechanism 461. This gear arrangement is known in the industry as a rack and pinion, wherein the gear 421 may be referred to as a pinion gear. The gear 421 may be connected to a motor shaft 422 of the motor 420. The motor 420 may commonly be an electric motor, but all other types of motors are considered within the scope of the present disclosure.

A motor controller 473 may be in communication with the motor 420 to control an activation and deactivation of the motor 420. The motor controller 473 may be located in an interior volume of a vehicle, thereby allowing a vehicle occupant to control an extension and/or retraction of the elongated members 130. For example, a vehicle occupant, such as a vehicle operator, may access a switch in communication with the motor controller 473, which may in turn activate the motor 420. The motor 420 may move the elongated member 130 via the gear 421 to extend or retract the rear bumper 150 (shown in FIG. 3).

Figure 5:
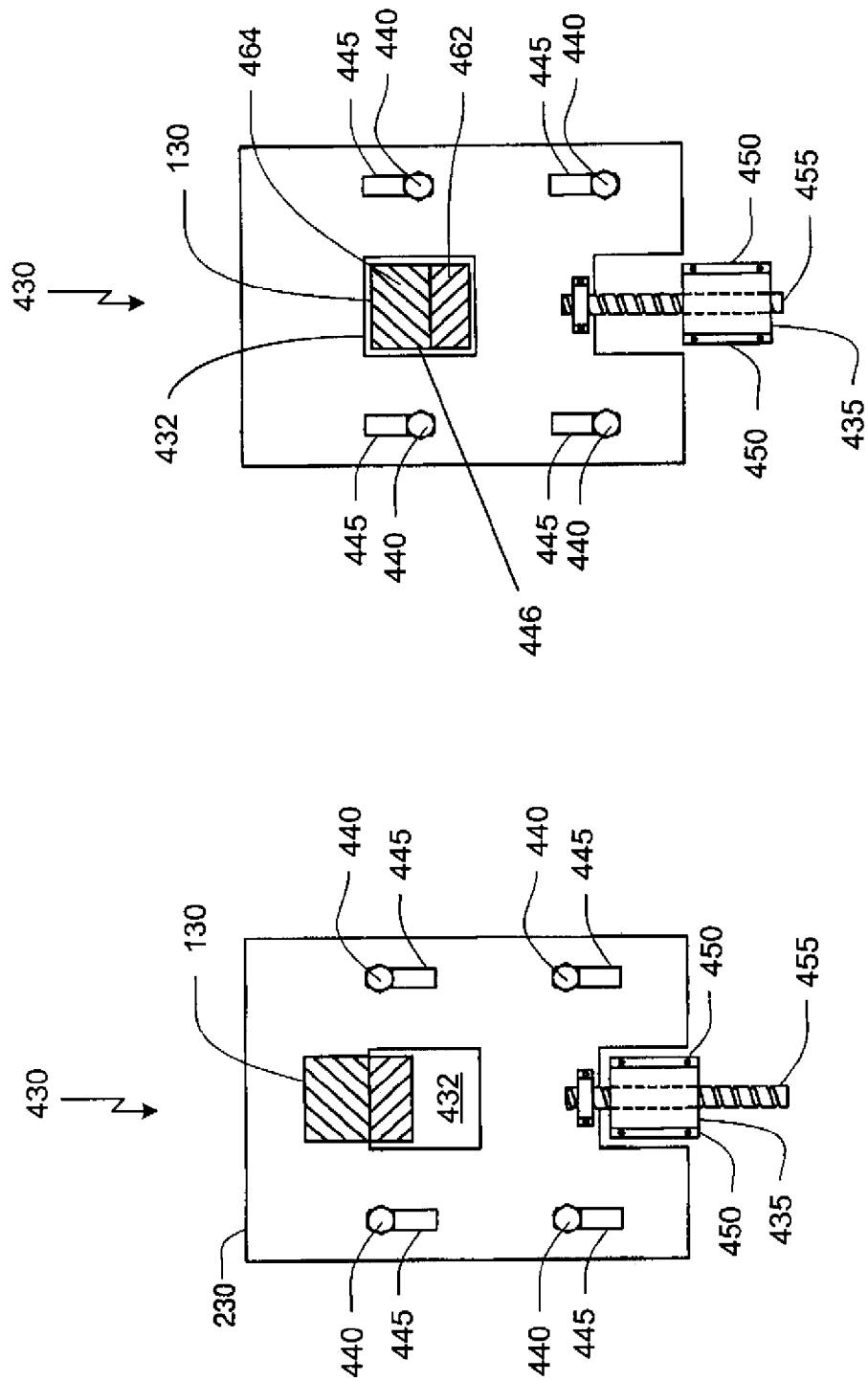
FIG. 5A is an illustration of a front view of a locking mechanism in a lowered position, in accordance with the first exemplary embodiment of the present disclosure.
FIG. 5B is an illustration of a front view of the locking mechanism in a raised position, in accordance with the first exemplary embodiment of the present disclosure.

A number of additional features may be included with the system 100, as shown in FIG. 3, or the shuttling mechanism 320, shown in FIG. 4, to enhance the usability and/or efficiency of the system 100. A locking mechanism 430 may be included to maximize the transfer of impact energy from the rear bumper 150, through the elongated members 130 to the first plate 310 as discussed further with reference to FIGS. 5A-5B. A rear pressure sensor 475 may be placed on the rear bumper to signal the motor controller 473 if the rear bumper is in contact with an obstacle. A rear range detector 465 may also be placed at the rear of the vehicle 110 and may signal the motor controller 473 when an object is proximate to the rear bumper 150. In either case, a signal from the rear pressure sensor 475 and/or the rear range detector 465 may cause the motor controller 473 to impede action of the motor 420. The motor controller 473 may also be in communication with any additional motors 420. In addition, the motor controller 473 may control a plurality of other motors 420 to provide fluid movement of the rear bumper 150.

FIG. 5A is an illustration of a front view of a locking mechanism 430 in accordance with the first exemplary embodiment of the present disclosure. FIG. 5B is an illustration of a front view of the locking mechanism 430, in accordance with the first exemplary embodiment of the present disclosure. The locking mechanism 430, in combination with the shuttling mechanism 320 of FIG. 4, may allow the rear bumper 150 to be extended and retracted while maintaining a connection to the container 120 (shown in FIG. 3). A locking mechanism 430 may be connected to the first plate 310 of FIG. 3 and engageable with the at least one elongated member 130.

The elongated member 130 may traverse the locking mechanism 430, through a central slot 432 of the locking mechanism 430. The locking mechanism 430 may be mounted to the plate 310 (shown in FIG. 3), with any number of fasteners 440. In accordance with the first exemplary embodiment, four fasteners 440 are included. The fasteners 440 may sit within four peripheral plate slots 445 that allow the locking mechanism 430 to be slidably oriented to the plate 310 (FIG. 3). FIG. 5A depicts the locking mechanism 430 slid into a lowered position and whereas FIG. 5B depicts the locking mechanism 430 slid into a raised position.

The locking mechanism 430 may be raised and lowered with a locking mechanism motor 435, which may be fastened to the plate 310 by a locking mechanism motor bracket 450. The locking mechanism motor 435 may be connected to the locking mechanism 430 by a locking mechanism shaft 455. The locking mechanism motor 435 may raise and lower the locking mechanism shaft 455, which may be rigidly attached to the locking mechanism 430, thereby raising and lowering the locking mechanism 430. For the locking mechanism 430 to be lowered, as shown in FIG. 5B, the elongated member 130 may be in an extended position such that the shaft tip 466 (best illustrated in FIG. 4) is contained within the central slot 432. As is illustrated, when the locking mechanism 430 is in the raised position, the second face 464 may be blocked by the locking mechanism 430.

In reference to FIGS. 1-5B, when the system 100 for absorbing impact energy is in use, the rear bumper 150 of the vehicle 110 may be hit by another vehicle while the bumper 150 is extended. If so, the impact force of the hit may be transmitted through the elongated members 130 to the shuttling mechanism 320. The locking mechanism 430 may prevent motion of the elongated member 130 relative to the plate 310. If the rear collision impact force is relatively low, the breakable bolts 340 (shown in FIG. 3) may not break, and therefore, the energy-absorbing material 350 will not be compressed within the container 120. However, during a collision with a high impact force, the second face 464 may be propelled into a back surface of the locking mechanism 430, which may pull on the plate 310 having the breakable bolts 340. If the collision exerts sufficient impact force on the elongated member 130, whereby the breakable bolts 340 break, the plate 310 may be propelled within the container 120, along with the locking mechanism 430 and other components of the shuttling mechanism 320. In accordance with the first exemplary embodiment and this description, the plate 310 may act like a piston and compress the energy-absorbing material 350.

Figure 6:
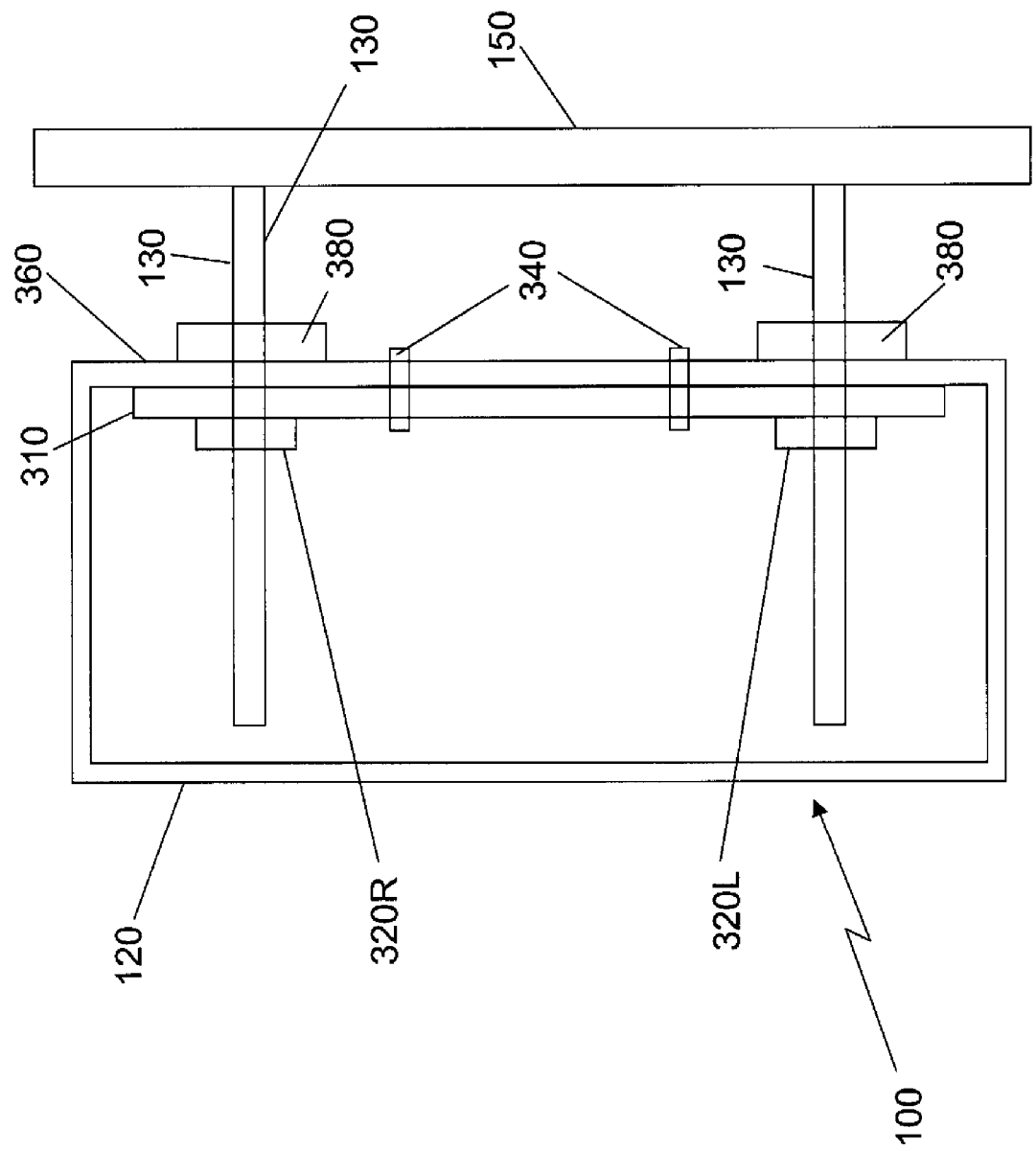
FIG. 6 is an illustration of a top view of the system in a retracted position, in accordance with the first exemplary embodiment of the present disclosure.

FIG. 6 is an illustration of a top view of the system 100 (in a retracted position), in accordance with the first exemplary embodiment of the present disclosure. FIG. 3 depicts the system 100 in an extended position, whereas FIG. 6 depicts the bumper 150 in the retracted position. Accordingly, the elongated members 130 have moved further within the container 120. As shown, the elongated members 130 may still be in a position proximate to the reinforcing plates 380 on the rear wall 360, the plate 310 mounted to the container 120 with the breakable bolts 340. Shuttling mechanism 320 may also be positioned about the elongated members 130. When in the retracted position, the elongated members 130 may traverse through cutout volumes in the energy-absorbing material 350, which may only slightly reduce the total volume of the energy-absorbing material included in the system 100. When the elongated members 130 are in the retracted position, the energy absorbing ability of the system 100 may be reduced.

The container 120 may be designed to be conveniently installed in a variety of different vehicles 110, having a variety of different structures. The container may include one hole or a series of holes in a bottom section. Additionally, an adapter plate may be used to interface between the container 120 and the vehicle 110, such that a hole of the container 120 corresponds with the structure of a particular vehicle 110. The adapter plate may be connected to the container 120, and then attached to the vehicle via holes within the vehicle chassis. The adapter plate may have one or more groupings of holes that are designed to conveniently attach to different vehicles. The holes may be in convenient locations, whereby they avoid vehicle structure obstacles, and correspond to locations where the adapter plate attaches to structural portions of the vehicle chassis. The system 100 may also include brackets to attach the container 120 to the vehicle 110, which attach to locations other than the bottom of the container 120.

Figure 7:
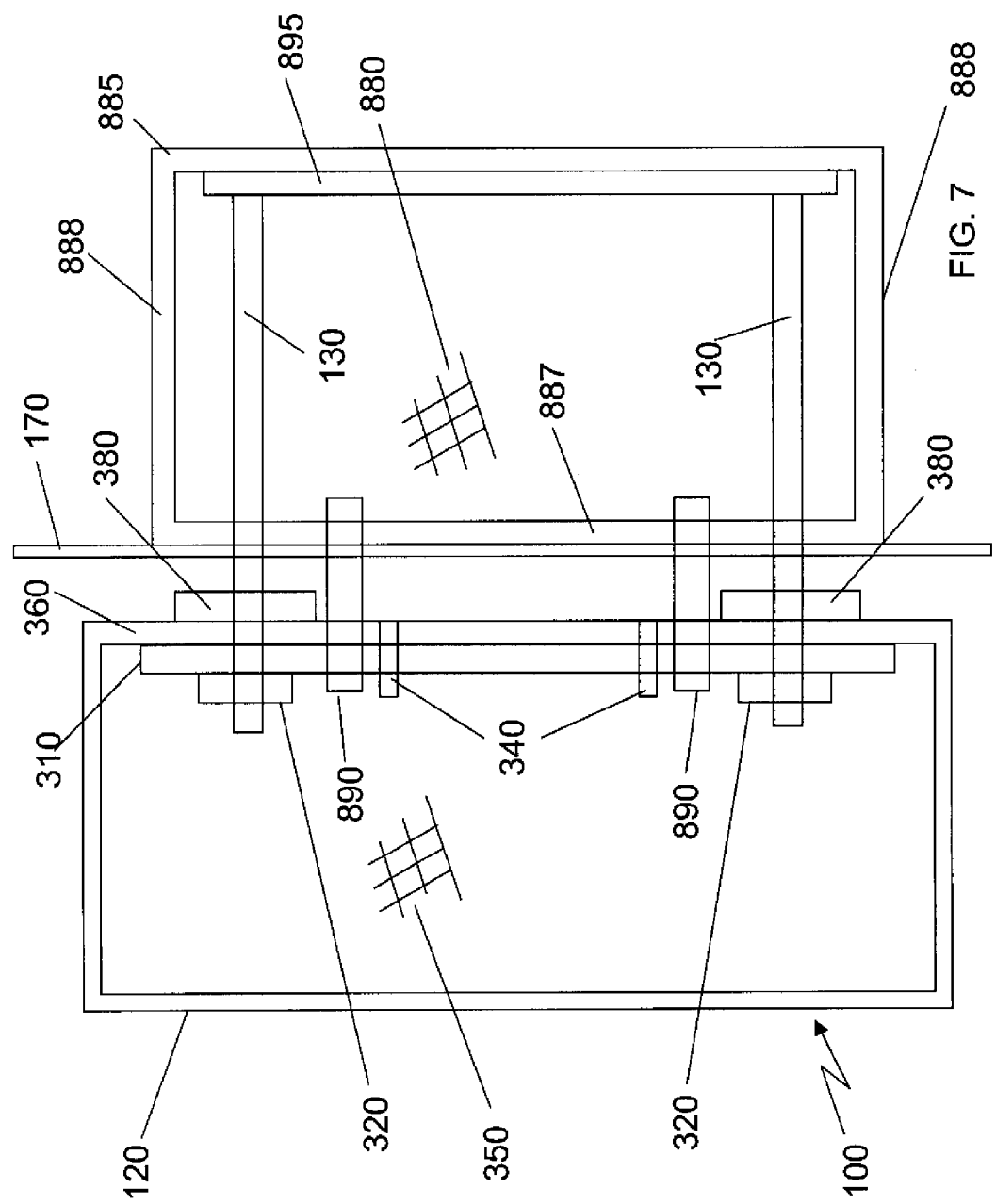
FIG. 7 is an illustration of a top view of a secondary external container, in accordance with the first exemplary embodiment of the present disclosure.

FIG. 7 is an illustration of a top view of a secondary external container 885, in accordance with the first exemplary embodiment of the present disclosure. The secondary external container 885 may be attached to the rear of a vehicle and function cooperatively with the container 120 located in the rear interior volume of the vehicle. A lower rear body panel 170 may be located between the container 120 and the secondary external container 885. The secondary external container 885 may be substantially filled with energy-absorbing material 880. An internal bumper 895 may be attached to the secondary external container 885, wherein elongated members 130 pass through the secondary external container 885, the lower rear body panel 170 and into the container 120. Fasteners 890, such as quick release fasteners may be used to connect container 120 and the secondary external container 885 together.

In a rear end collision, the volume of energy-absorbing material 880 in the secondary external container 885 may work in cooperation with the volume of energy-absorbing material 350 in the container 120. The secondary external container 885 may compress in a rear end collision, wherein the internal bumper 895 compresses the energy-absorbing material 880 while the elongated members 130 cause the plate 310 to compress the energy-absorbing material 350 in the container 120. Any of the sides 888 of the secondary external container 885, which may include a top and bottom of the secondary external container 885 may be designed to crumple in a manner that urges the energy-absorbing material 880 into a shape that maximizes the energy absorbing properties of the system 100. The secondary external container 885 may be added to the vehicle 110 when greater energy absorption is desired, but it can be easily removed for any reason.

Figure 8:
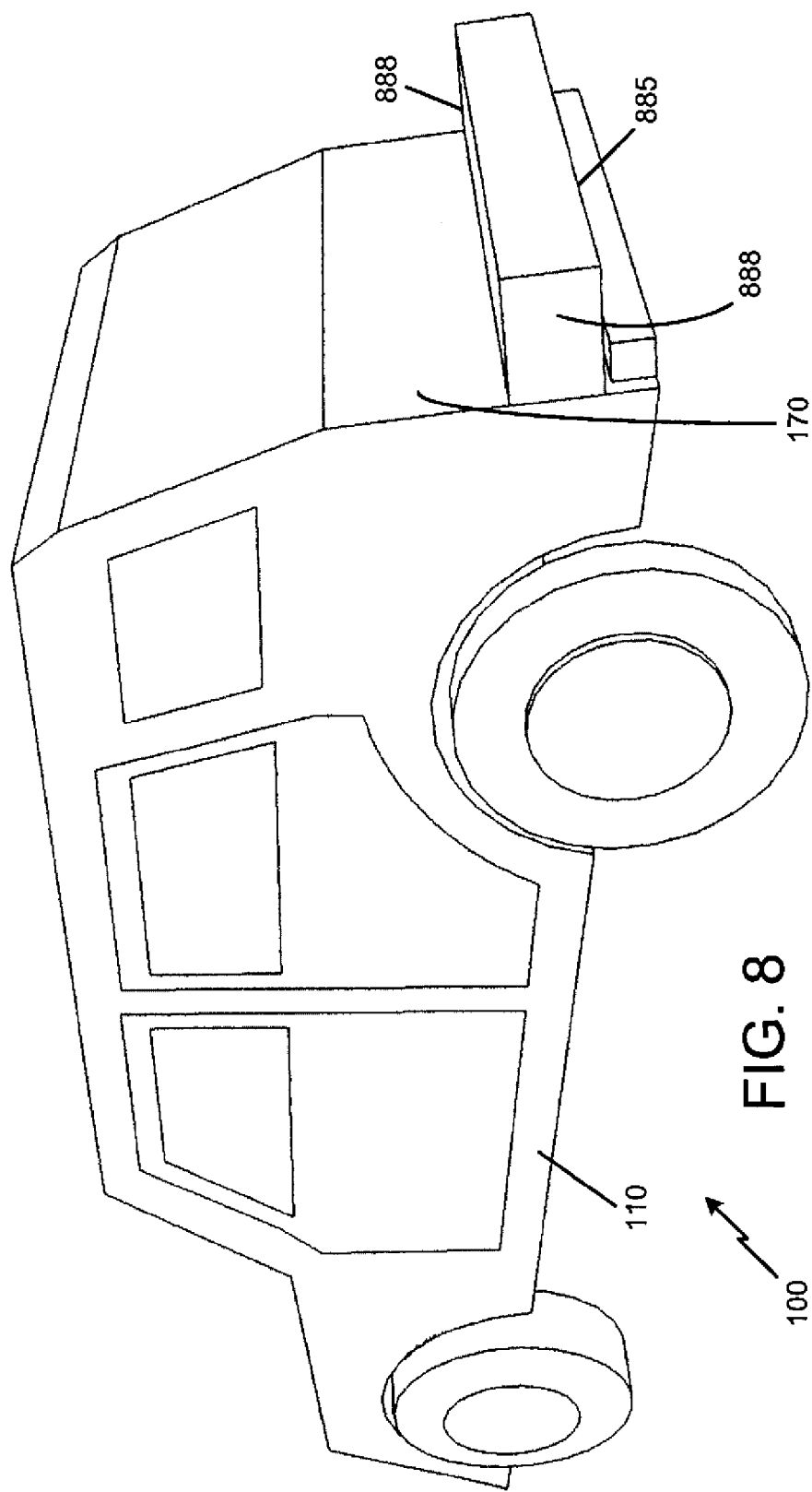
FIG. 8 is an illustration of a plan view of the secondary external container of FIG. 7, in accordance with the first exemplary embodiment of the present disclosure.

FIG. 8 is an illustration of a plan view of the system 100 having a secondary external container 885 of FIG. 7, in accordance with the first exemplary embodiment of the present disclosure. As can be seen, the secondary external container 885, having sides 888, may be attached to the rear of the vehicle 110 and function cooperatively with the container 120 (shown in FIG. 7) located in the rear interior volume of the vehicle 110. A lower rear body panel 170 may be located between the container 120 (FIG. 7) and the secondary external container 885.

Figure 9:
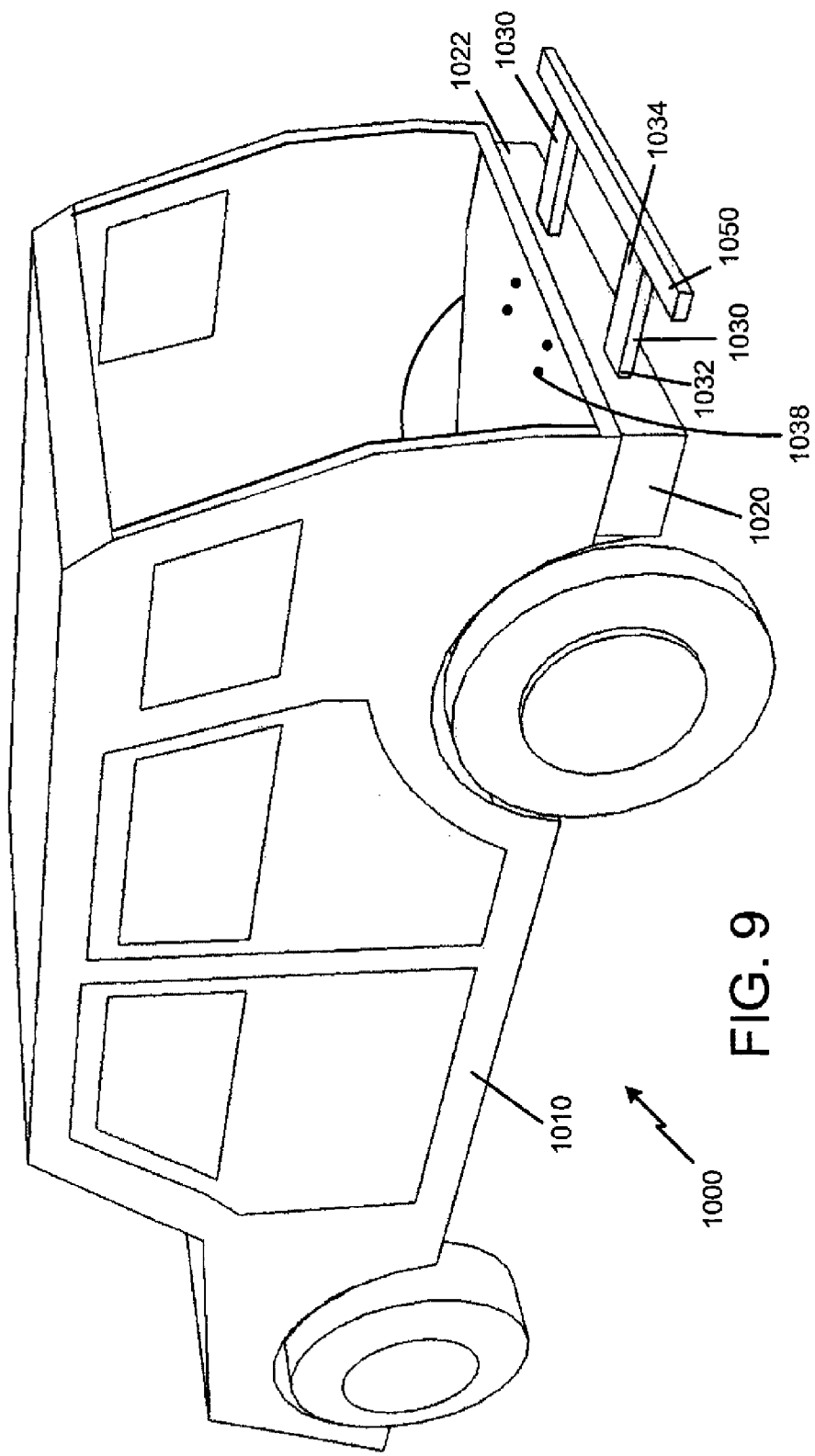
FIG. 9 is an illustration of a plan view of a system for absorbing impact energy, in accordance with a second exemplary embodiment of the present disclosure.

FIG. 9 is an illustration of a plan view of a system 1000 for absorbing impact energy, in accordance with a second exemplary embodiment of the present disclosure. The system 1000 includes a container 1020 formed with a plurality of faces. The container 1020 is attached to a vehicle 1010. An energy-absorbing material (not shown) is contained substantially within the container 1020. At least one elongated member 1030 is included. The at least one elongated member 1030 has a proximate end 1032 and a distal end 1034. The proximate end 1032 is located to a first face 1022 of the container 1020, wherein a long axis of the at least one elongated member 1030 intersects the first face 1022. A bumper 1050 is connected to the distal end 1034 of the at least one elongated member 1030.

The system 1000 of the second exemplary embodiment functions similarly to the system 100 of the first exemplary embodiment, described with reference to FIGS. 1-8. However, as can be seen in FIG. 9, the container 1020 is attached to the vehicle 1010 in a location that is external to the vehicle 1010, whereas in the first exemplary embodiment, the container 120 is located within an interior volume of the vehicle 110 (shown in FIG. 1). Other aspects of the system 1000, including the functioning of the elongated members 1030, the plate, the reinforcement members, the breakable bolts, the shuttling mechanism, the motor, the motor controller and any other components, may function in the manner described with respect to the first exemplary embodiment.

The container 1020 of system 1000 may be attached to any structure of the vehicle 1010 that is external to the interior volume of the vehicle 1010, such as a chassis member that is exposed on the underside of the vehicle 1010, or another exterior position of the vehicle 1010. However, the container 1020 may also be attached to the vehicle 1010 at other locations on the vehicle 1010, such as on a rear bumper of the vehicle 1010, or on an external part of a rear door of the vehicle 1010. The container 1020 may be attached via a fastener 1038 located between the container 1020 and a structural member of the vehicle 1010. The fastener 1038 may include any fastener available, such as a quick release fastener, whereby the system 1000 can be conveniently removed and later re-installed. Additionally, the system 1000 may include an adapter plate (not shown) to allow the container 1020 to attach to the vehicle 1010. Other designs and configurations of the system 1000 or any components thereof may be employed to allow for successful use of the system 1000 in a location external to the vehicle.

Figure 10:
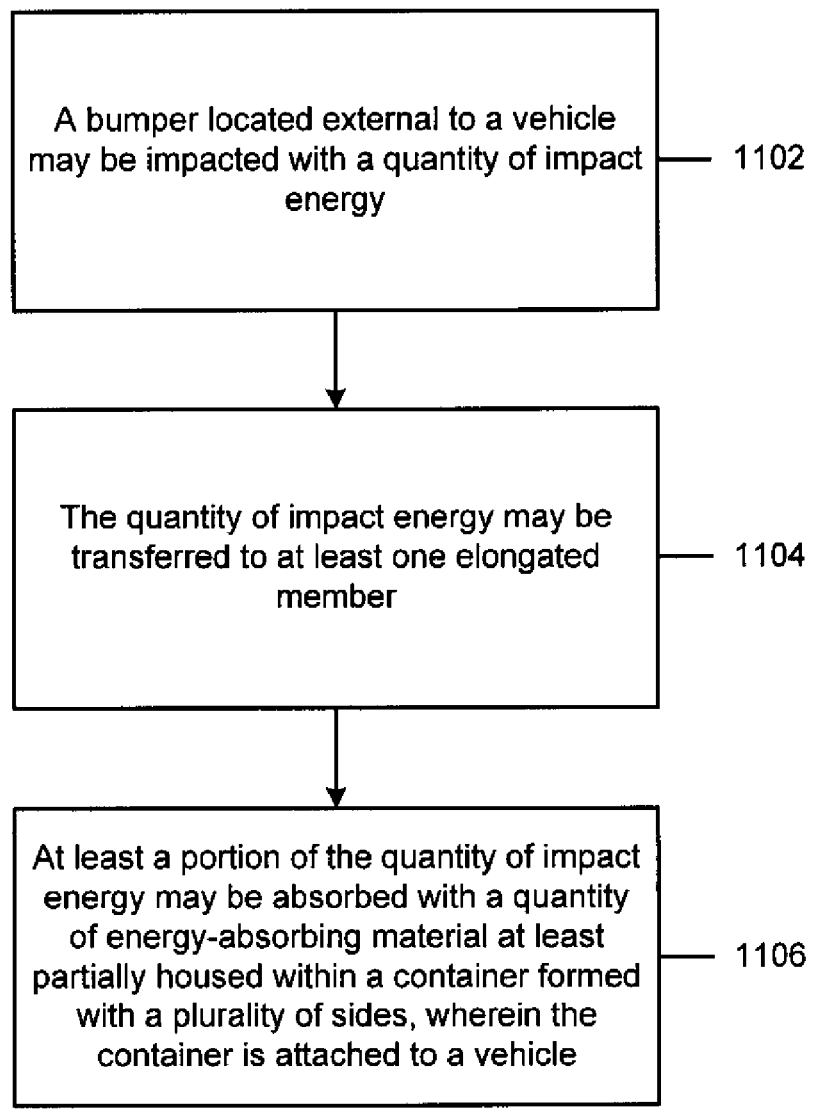
FIG. 10 is a flowchart 1100 illustrating a method of absorbing impact energy, in accordance with a third exemplary embodiment of the present disclosure.

FIG. 10 is a flowchart 1100 illustrating a method of absorbing impact energy, in accordance with a third exemplary embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

A bumper located external to a vehicle may be impacted with a quantity of impact energy (block 1102). The quantity of impact energy may be transferred to at least one elongated member (block 1104). At least a portion of the quantity of impact energy may be absorbed with a quantity of energy-absorbing material at least partially housed within a container formed with a plurality of sides, wherein the container is attached to a vehicle (block 1106). The at least one elongated member may have a proximate end and distal end, wherein the proximate end is proximate to a first face of the container and a long axis of the at least one elongated member intersects the first face. The container may also include a first plate connected within the container and connected to the proximate end of the at least one elongated member, wherein the first plate is connected to the container with at least one breakable bolt. The at least one breakable bolt may be mounted at least partially between a first plate to at least one of the plurality of sides of the container, and may be broken from the force of the quantity of impact energy. A shuttle mechanism may be included and situated to shuttle at least of portion of the at least one elongated member within the container.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed is:

1. A system for absorbing impact energy, the system comprising:
   a container formed with a plurality of faces, the container attached to a vehicle with a quick attaching and quick release mechanism;
   an energy-absorbing material substantially contained within the container;
   at least two elongated members, each having a proximate end and a distal end, the proximate end positioned proximate to a plate, wherein the plate is positioned to compress the energy absorbing material in the container; and
   a bumper proximate to the distal end of the at least two elongated members, whereby a collision force on the bumper translates the collision force from the bumper, through the at least two elongated members, to the energy absorbing material.

2. The system of claim 1, wherein the container is located in a rear interior volume of the vehicle.

3. The system of claim 1, wherein the container is located in an exterior position of the vehicle.

4. The system of claim 2, wherein the at least two elongated member extend from the rear interior volume of the vehicle to a location exterior to the vehicle.

5. The system of claim 1, wherein the at least two elongated members traverse at least one of the faces of the container.

6. The system of claim 1, wherein the container is attached to at least one structural member of the vehicle.

7. The system of claim 1, wherein the bumper is connected to the distal end of the at least two elongated members.

8. The system of claim 1, further comprising the first plate mounted within the container and connected to the proximate end of the at least two elongated members.

9. The system of claim 8, wherein the first plate is connected to the container with at least one breakable bolt.

10. The system of claim 1, further comprising a reinforcing bracket mounted on or exterior to the container and at least partially around the at least two elongated members.

11. A method of absorbing impact energy, the method comprising:
    impacting a bumper located external to a vehicle with a quantity of impact energy;
    transferring the quantity of impact energy from the bumper to at least one elongated member;
    transferring the quantity of impact energy from the at least one elongated member to a quantity of energy-absorbing material at least partially housed within a container formed with a plurality of sides;
    releasing a first plate with a retaining mechanism, wherein the first plate is connected to at least one of the plurality of sides of the container and the at least one elongated member, wherein the retaining mechanism is positioned between the first plate and the at least one of the plurality of sides of the container, whereby the retaining mechanism releases the first plate under a given impact force; and
    absorbing at least a portion of the quantity of impact energy with the quantity of energy-absorbing material, wherein the container is attached to a vehicle with a quick attaching and quick release mechanism.

12. The method of claim 11, further comprising the step of breaking at least one breakable bolt at least partially connecting a first plate to at least one of the plurality of sides of the container.

13. A system for absorbing impact energy, the system comprising:
    a container formed with a plurality of faces, the container attached to a vehicle;
    an energy-absorbing material substantially contained within the container;
    at least one elongated member having a proximate end and a distal end, the proximate end proximate to a first face of the container, wherein a long axis of the at least one elongated member intersects the first face;
    further comprising a first plate mounted within the container and connected to the proximate end of the at least one elongated member, wherein the first plate is connected to the container with at least one breakable bolt; and
    a bumper connected to the distal end of the at least one elongated member.

14. The system of claim 1, further comprising a first plate mounted within the container and directly attached to the at least two elongated members.

* * * * *